United States Patent
Schaal et al.

(10) Patent No.: US 12,208,887 B2
(45) Date of Patent: Jan. 28, 2025

(54) LIFT UNIT FOR AN AIRCRAFT

(71) Applicant: Dr. Ing. h.c. F. Porsche Aktiengesellschaft, Stuttgart (DE)

(72) Inventors: Thomas Schaal, Oberstenfeld (DE); Sebastian Riesbeck, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 21 days.

(21) Appl. No.: 18/079,181

(22) Filed: Dec. 12, 2022

(65) Prior Publication Data

US 2023/0182895 A1 Jun. 15, 2023

(30) Foreign Application Priority Data

Dec. 14, 2021 (DE) ..................... 10 2021 132 911.6

(51) Int. Cl.
*B64C 27/20* (2023.01)
*B64D 27/34* (2024.01)

(52) U.S. Cl.
CPC .............. *B64C 27/20* (2013.01); *B64D 27/34* (2024.01)

(58) Field of Classification Search
CPC .. B64C 27/20; B64D 27/24; B64D 27/30–32; B64D 27/34; B64D 27/40; B64D 27/402
See application file for complete search history.

(56) References Cited

U.S. PATENT DOCUMENTS

| | | | | |
|---|---|---|---|---|
| 6,892,980 B2* | 5/2005 | Kawai | ................. | B64C 29/0033 244/12.4 |
| 6,976,653 B2* | 12/2005 | Perlo | ....................... | B64C 29/02 244/34 A |
| 7,874,515 B2* | 1/2011 | Kinkopf | .................... | B64B 1/32 96/30 |
| 8,016,226 B1* | 9/2011 | Wood | ................... | B64C 29/0033 244/23 B |
| 8,342,441 B2* | 1/2013 | Yoeli | ...................... | B64U 50/20 244/17.11 |
| 9,004,973 B2* | 4/2015 | Condon | ............... | G05D 1/0033 446/37 |
| 9,150,069 B2* | 10/2015 | Kalantari | ................ | B64C 25/36 |
| 10,023,309 B2* | 7/2018 | Brown | .................... | A63H 27/02 |
| 10,737,780 B2* | 8/2020 | Ismagilov | ............... | B64C 27/52 |
| 10,974,823 B2* | 4/2021 | Van Niekerk | .......... | B64U 30/26 |

(Continued)

FOREIGN PATENT DOCUMENTS

| CN | 210284604 U | 4/2020 |
|---|---|---|
| CN | 211033019 U | 7/2020 |

(Continued)

OTHER PUBLICATIONS

Duffy, M. et al., "Propulsion Scaling Methods in the Era of Electric Flight", AIAA Propulsion and Energy Forum, 2018 AIAA/IEEE Electric Aircraft Technologies Symposium, Jul. 9-11, 2018, Cincinnati, OH, 23 pages.

*Primary Examiner* — Nicholas McFall
*Assistant Examiner* — Marisa V Conlon
(74) *Attorney, Agent, or Firm* — Buchanan Ingersoll & Rooney PC

(57) ABSTRACT

A lift unit for an aircraft, having the following features: a fan, an engine bearing axially offset from the fan, and a cylindrical electric engine having a sheath surface framed by the engine bearing.

9 Claims, 9 Drawing Sheets

(56) References Cited

U.S. PATENT DOCUMENTS

| | | | | |
|---|---|---|---|---|
| 11,148,808 | B2 * | 10/2021 | Wiggerich | B64U 30/26 |
| D943,457 | S * | 2/2022 | Liu | D12/16.1 |
| 11,511,854 | B2 * | 11/2022 | Baity | B64U 30/297 |
| 11,673,648 | B2 * | 6/2023 | Carpenter, Jr. | B64C 11/001 |
| | | | | 244/54 |
| 11,866,164 | B2 * | 1/2024 | Winkelstein | G06V 10/764 |
| 2014/0339355 | A1 | 11/2014 | Olm et al. | |
| 2016/0291445 | A1 * | 10/2016 | Fisher, Sr. | F16M 11/10 |
| 2019/0351999 | A1 | 11/2019 | Stamps et al. | |
| 2020/0164971 | A1 | 5/2020 | Wang et al. | |
| 2021/0371117 | A1 | 12/2021 | Hoffmeister | |
| 2022/0111950 | A1 | 4/2022 | Scholl et al. | |

FOREIGN PATENT DOCUMENTS

| | | |
|---|---|---|
| CN | 211167430 U | 8/2020 |
| CN | 211996121 U | 11/2020 |
| DE | 202014009436 U1 | 1/2015 |
| DE | 102020109331 B3 | 7/2021 |
| DE | 102020127041 B3 | 9/2021 |
| DE | 102020109330 A1 | 10/2021 |
| DE | 102020118674 A1 | 1/2022 |
| DE | 102020118677 A1 | 1/2022 |
| EP | 2772429 A1 | 9/2014 |
| EP | 3819212 A1 | 5/2021 |

* cited by examiner

LIFT UNIT FOR AN AIRCRAFT

CROSS-REFERENCE TO RELATED APPLICATION

This application claims priority to German Patent Application No. 10 2021 132 911.6, filed Dec. 14, 2021, the content of such application being incorporated by reference herein in its entirety.

FIELD OF THE INVENTION

The present invention relates to a lift unit for an aircraft. The present invention further relates to an aircraft having such a unit.

BACKGROUND OF THE INVENTION

In aerospace technology, the term VTOL refers to any type of aircraft, drone, or rocket that has the ability to take off and land substantially vertically and without the need for a take-off and landing runway. This collective term is subsequently used in a broad sense, which includes not only fixed-wing aircraft having wings, but also rotorcraft such as helicopters, gyrocopters, gyrodynes, and hybrids such as combined helicopters or combined gyros as well as convertiplanes. Furthermore, aircraft capable of short take-off and landing (STOL), short take-off and vertical landing (STOVL), or vertical take-off and horizontal landing (VTHL) are included here.

CN210284604U, which are incorporated by reference herein, discloses an engine fastened to the wing of an unmanned aircraft by means of a bolt.

CN211033019U, which are incorporated by reference herein, proposes connecting the engine pedestal to an unmanned aircraft by means of a screw.

CN211167430U, which are incorporated by reference herein, describes an engine housing connected to an unmanned aircraft via radial webs.

CN211996121U, which are incorporated by reference herein, discusses radially fastening a block fixedly connected to the engine to the support rod via a screw.

SUMMARY OF THE INVENTION

The invention provides a lift unit for an aircraft and an aircraft equipped with such a unit.

The approach described herein is based on the insight that a VTOL aircraft capable of being used in urban environments requires propulsion units that are able to handle every flight phase (start, transition, cruising, and landing) but are also designed to comply with the strict design principles of structural and system lightweight construction.

Conventionally, an electric engine is mounted on an engine bearing for this purpose. Although this solution has aerodynamic advantages, it results in a lift unit of considerable height (see FIGS. 1 to 3). In the case of limited installation space, this disadvantage is not acceptable.

In order to create a particularly flat lift unit without restricting the height of the actual engine, its beam is moved from the bottom to the periphery of the engine, according to aspects of the invention. A further advantage of this solution is that it lowers the load to which the bearing locations are subjected by the fan dynamics by shortening the lever arm to the fan.

Further advantageous embodiments of the invention are specified in the claims. Thus, instead of a free-traveling rotor, ducted fans can be provided, which are integrated into the wing and are covered by fins, such as those known outside the field of aviation technology from air cushion vehicles or air boats, for example. The cylindrical housing surrounding the respective lift rotor, the so-called ducted ring, can reduce the thrust losses occurring in conventional fans as a result of turbulence at the blade tips.

Further, a streamlined fairing of the fan hub in the form of a so-called spinner can be provided. In a corresponding embodiment, a lift unit composed of an engine, fan, spinner, engine bearing, and an upper and lower fin assembly can be designed in such a compact manner that it finds space even in a wing of low construction height.

Further, it can be provided that the nose of the aircraft has a cavity out of which the lift unit can be extended as needed. Thanks to the flat design of the lift unit according to aspects of the invention, this variant can also be easily implemented.

Further, it can be provided that the lift unit comprises shear bolts radially oriented towards the electric engine, which bolts connect the engine housing to the engine bearing in a torsionally rigid manner and thus supports the loads caused by the engine torque, the aerodynamic lift, and the vibrations. The number and placement of these bolts can be easily adjusted to the load, wherein three bolts already satisfy the static specificity of the engine.

Finally, the engine bearer can be integrated into the aerodynamic structure of the aircraft in order to avoid thrust-reducing air turbulence.

BRIEF DESCRIPTION OF THE DRAWINGS

Exemplary embodiments of the invention are shown in the drawing and are described in further detail below.

DETAILED DESCRIPTION OF THE INVENTION

An aircraft is equipped with two free-traveling and foldable lift rotors on both sides of the nose—hereinafter: "nose lifting units"—a total of six ducted and finned lift rotors in the bilateral wings—hereinafter: "wing lift units"—as well as two rearward fans with elongated sheaths—hereinafter: "cruising thrust units." (In this context, the term "fan" is always used in a broad sense of the word, which includes the primarily propulsion-serving travel thrust units on the one hand and the lift-serving nose and wing lift units on the other hand; accordingly, sheathed thrust and lift units are equally referred to as "ducted fans.") In the cruising and ground configuration, the fins of the wing lift units are closed and the nose lift units are folded under or into the fuselage; whereas, when suspended, the fins of the wing lift units are open and both nose lift units are unfolded sideways.

Figure 4:
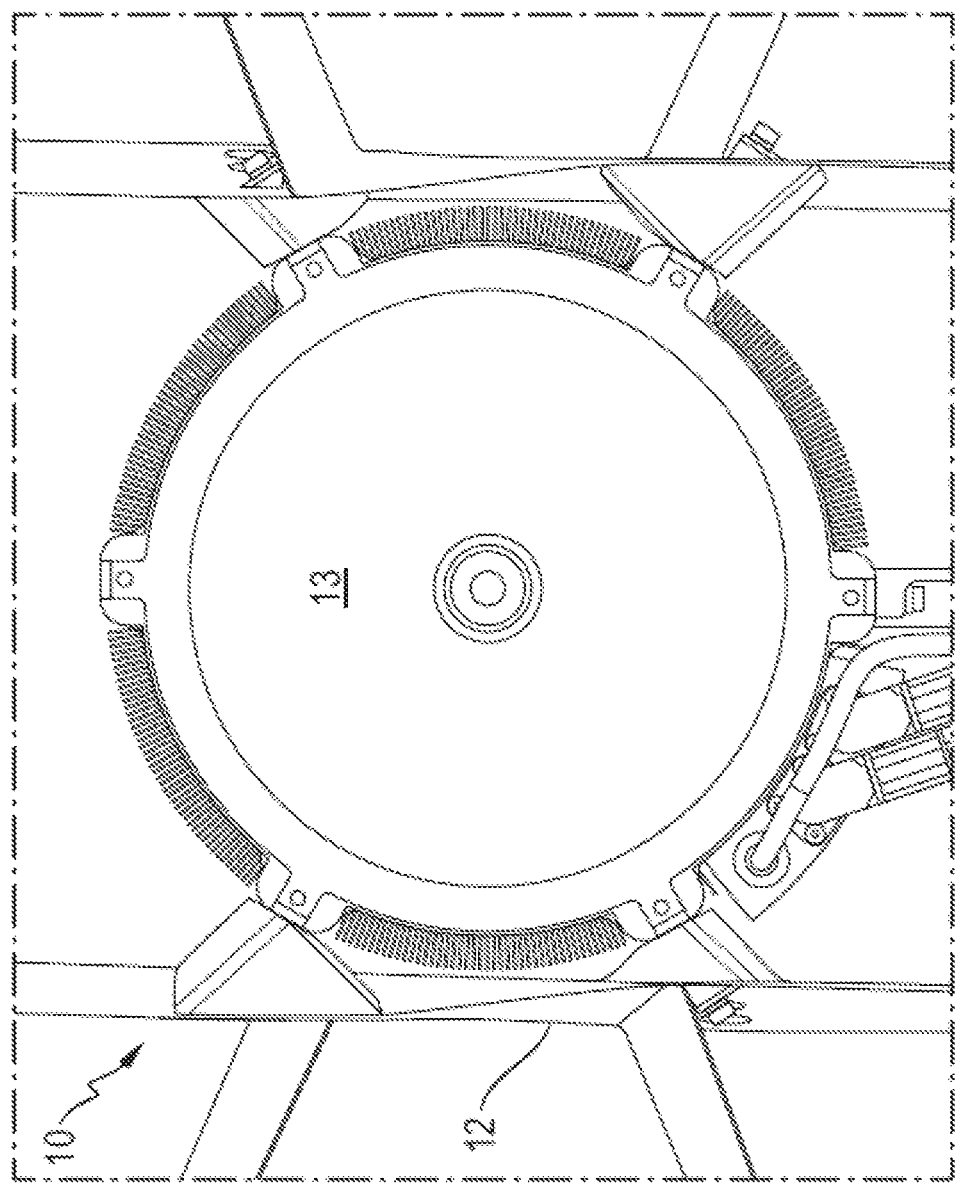
FIG. 4 shows the bottom view of a wing lift unit according to one embodiment.

FIG. 4 illustrates the bearing of the electric engine of one of the wing lift units (10). In this embodiment, the engine bearing (12) is formed by a guide grid (12) made of carbon or carbon fiber-reinforced plastic (CFC), which supports the electric engine (13) in an axially and rotationally symmetrical arrangement of opposite sides. Two struts of the guide grid (12) run parallel to one another in the upstream direction of the wing—not shown here in its entirety—and tangentially flank the associated electric engine (13). Two bars joined to these cheeks are complemented by the bars of the opposite cheek diametrically opposite the engine in order to form an diagonal cross and stiffen the electric engine (13) such that the guide grid (12) assumes all horizontal forces in the engine plane.

Figure 5:
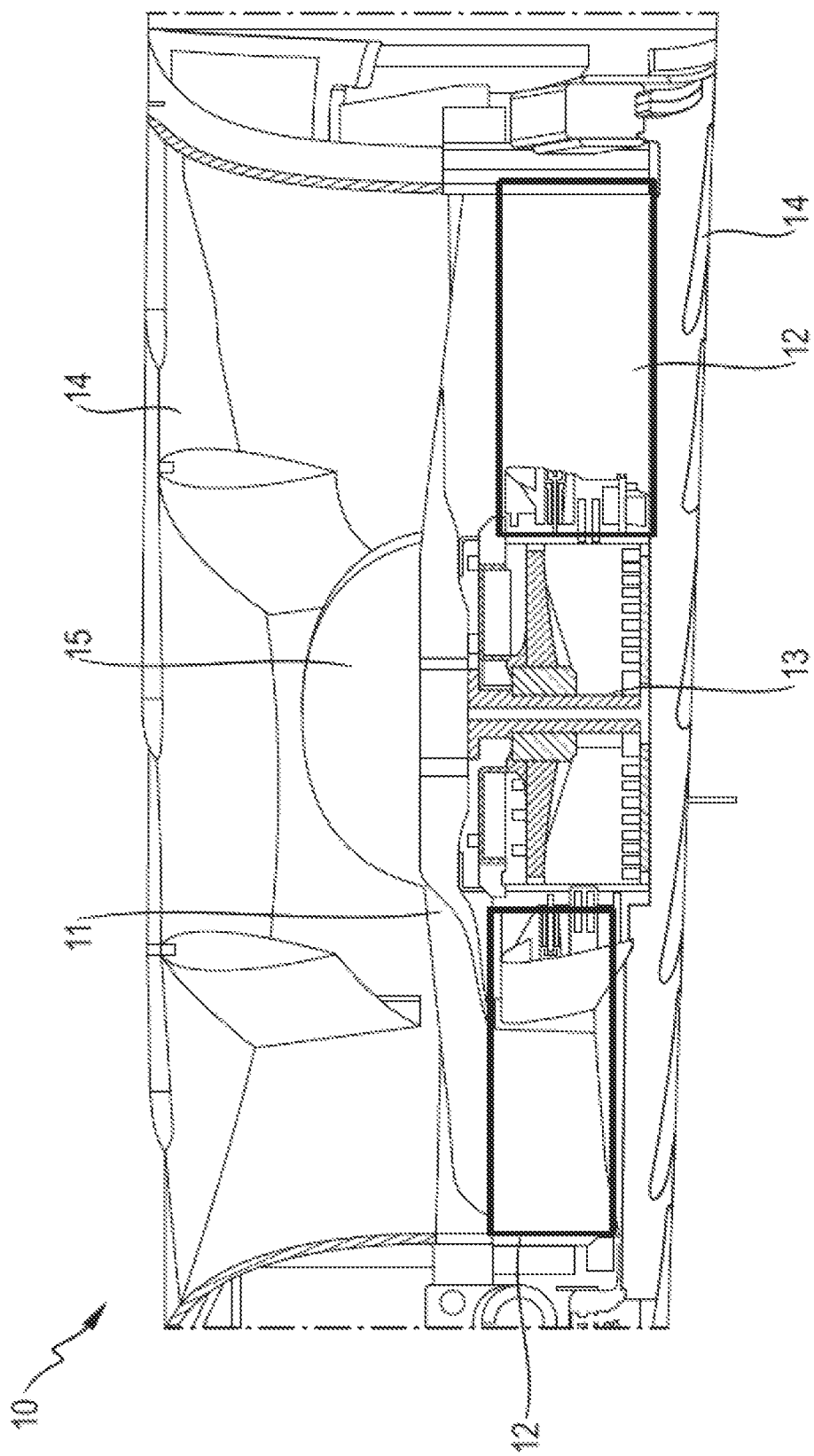
FIG. 5 shows a longitudinal section of the wing lift unit along the fan axis.

As can be seen in FIG. 5, the struts of the guide grid (12) have a width that approximates the height of the electric engine (13). In the present case, the latter supports a fan (11) axially offset from the engine bearing (12) and lined with a blunt spinner (15). In the illustrated configuration, the inlet and outlet of the fan sheath are closed by front-facing fin assemblies (14), but can be opened as needed via a drive, which is only suggested in the drawings.

Figure 1:
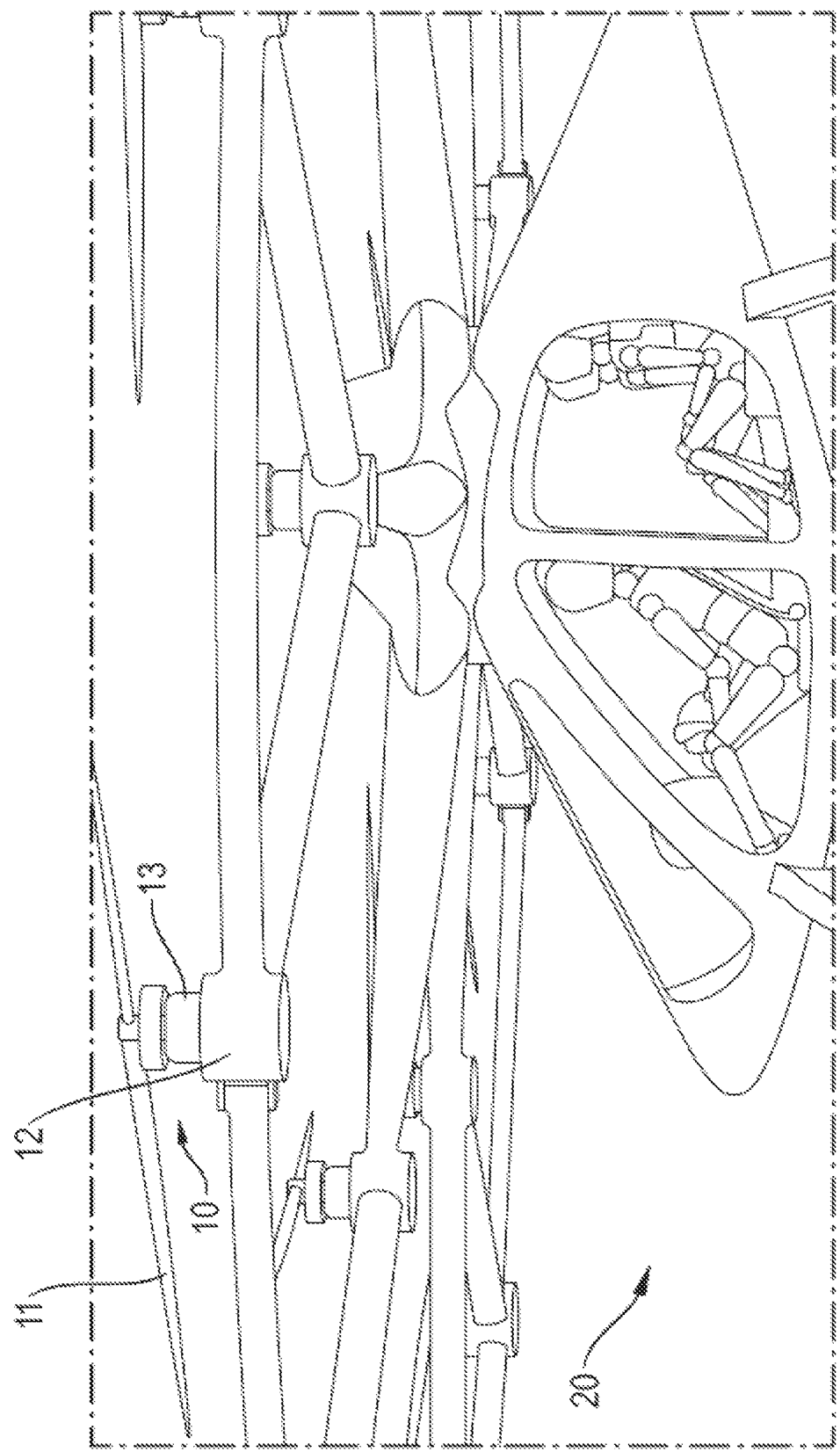
FIGS. 1 to 3 show vertically startable aircraft according to the prior art.
Figure 2:
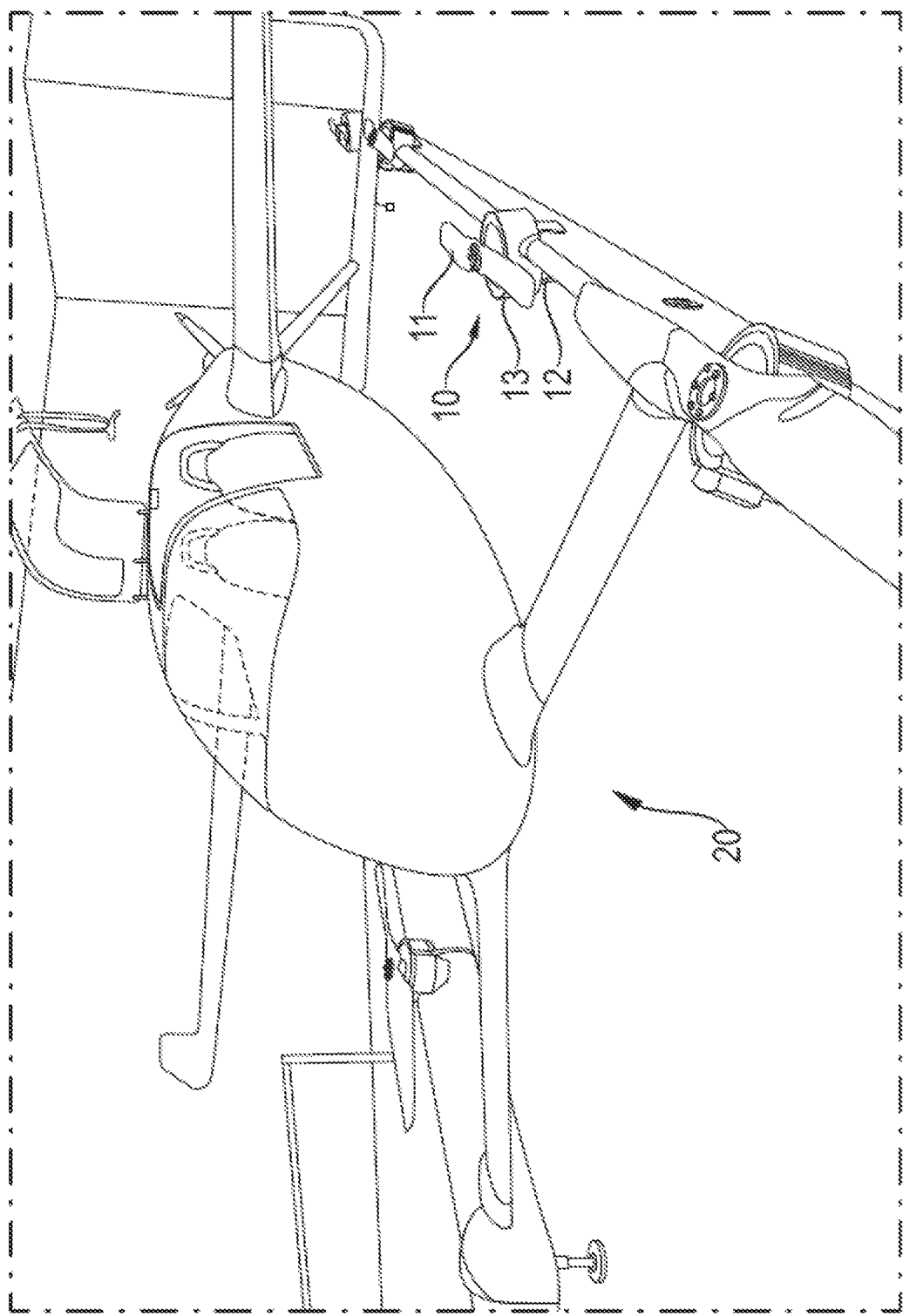
Figure 3:
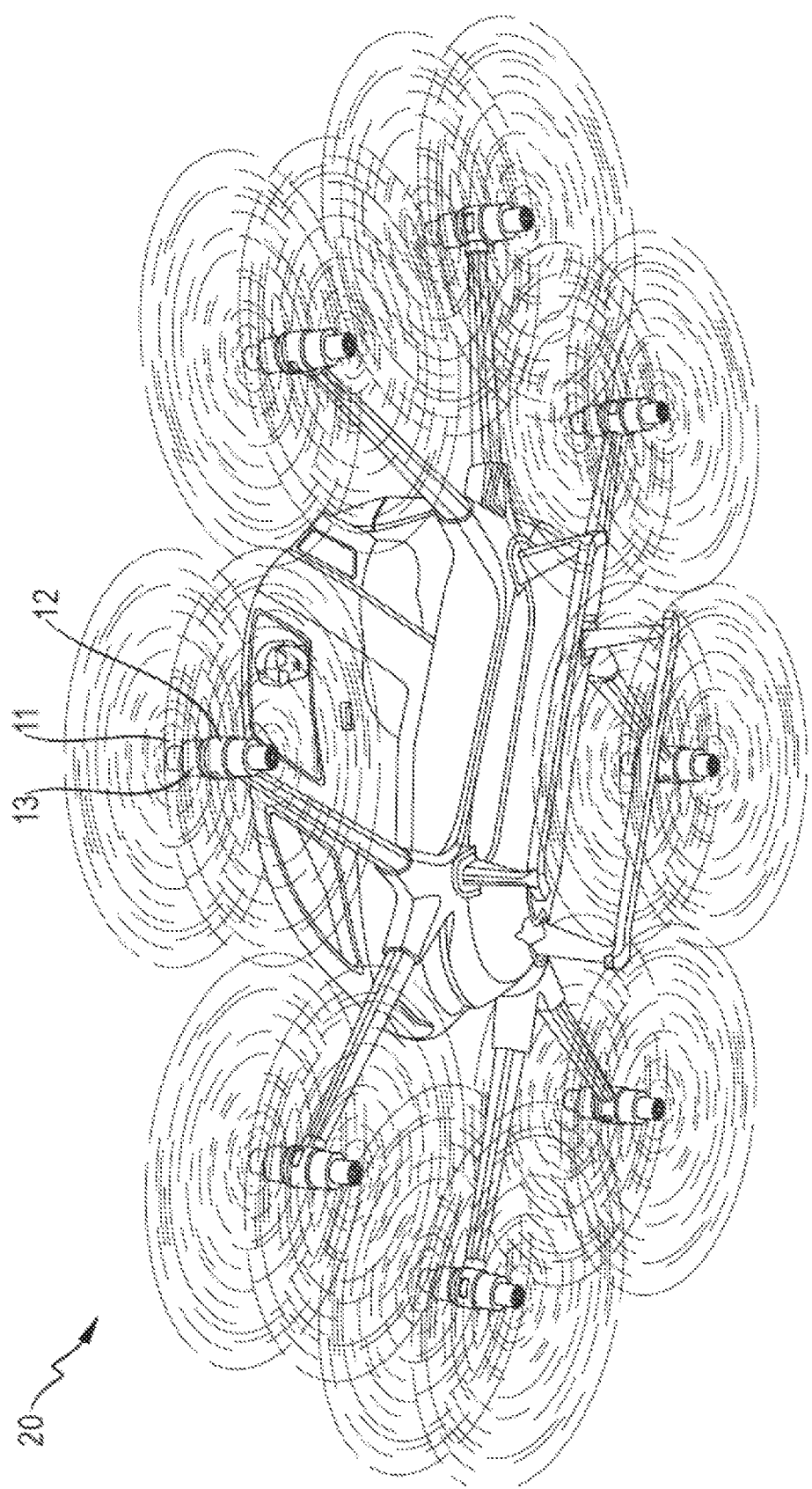
Figure 6:
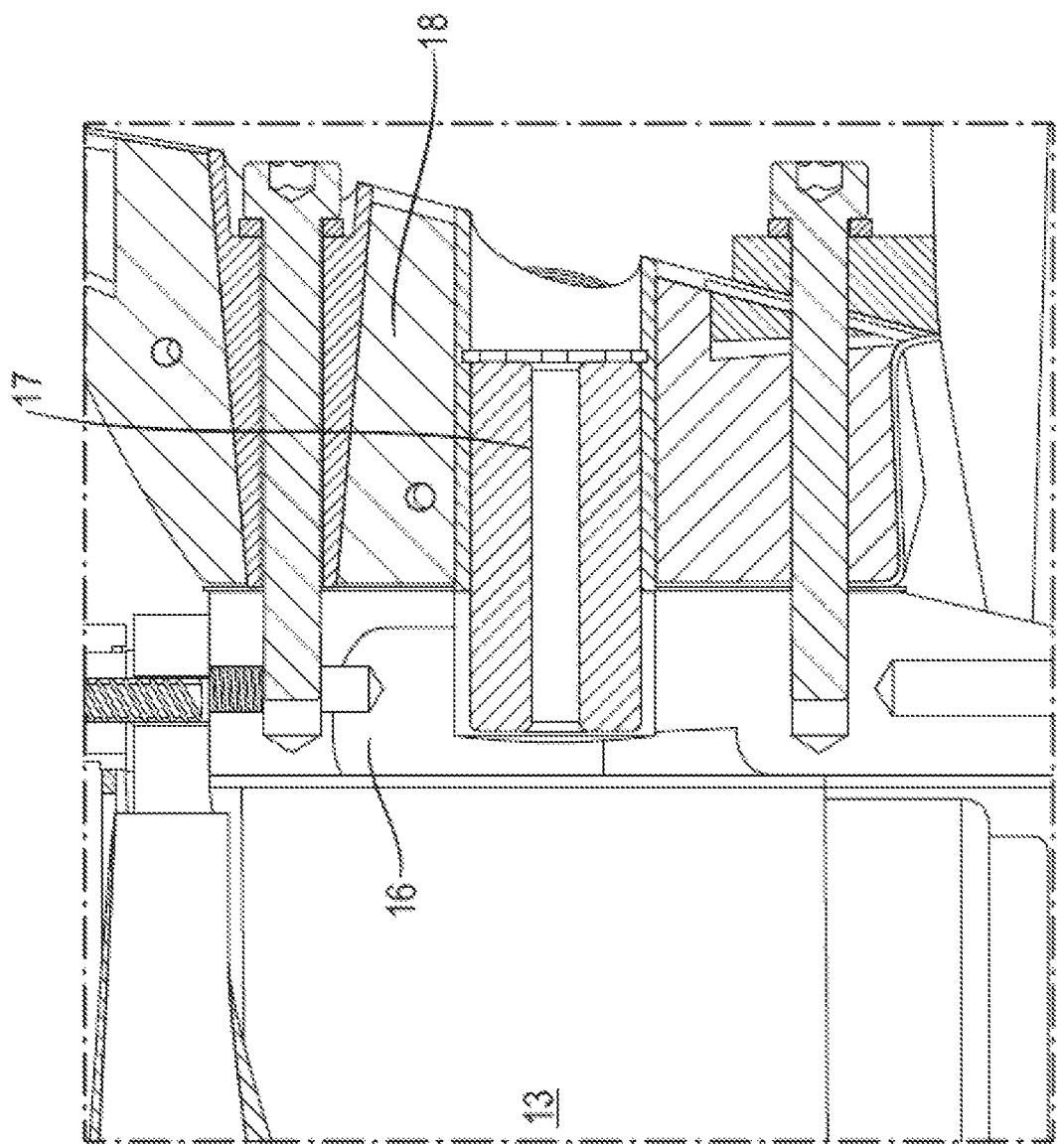
FIG. 6 shows a detail of the wing lift unit in a view corresponding to FIG. 5.

FIG. 6 illuminates the connection of the electric engine (13) at the support point of one of the struts of the guide grid (12—cf. FIG. 3). As can be seen in the drawing, in the embodiment shown, the engine housing (16) defines the sheath surface of the cylindrical engine, which is framed by engine bearings (12) integrally configured with the vehicle structure (18). To the latter, the engine housing (16) is connected by a crushing or shear bolt (17) oriented radially to the electric engine (13), which, in the case of substantial damage to the lift unit (10), yields under strong vibration and allows for controlled ejection of the electric engine (13).

Figure 7:
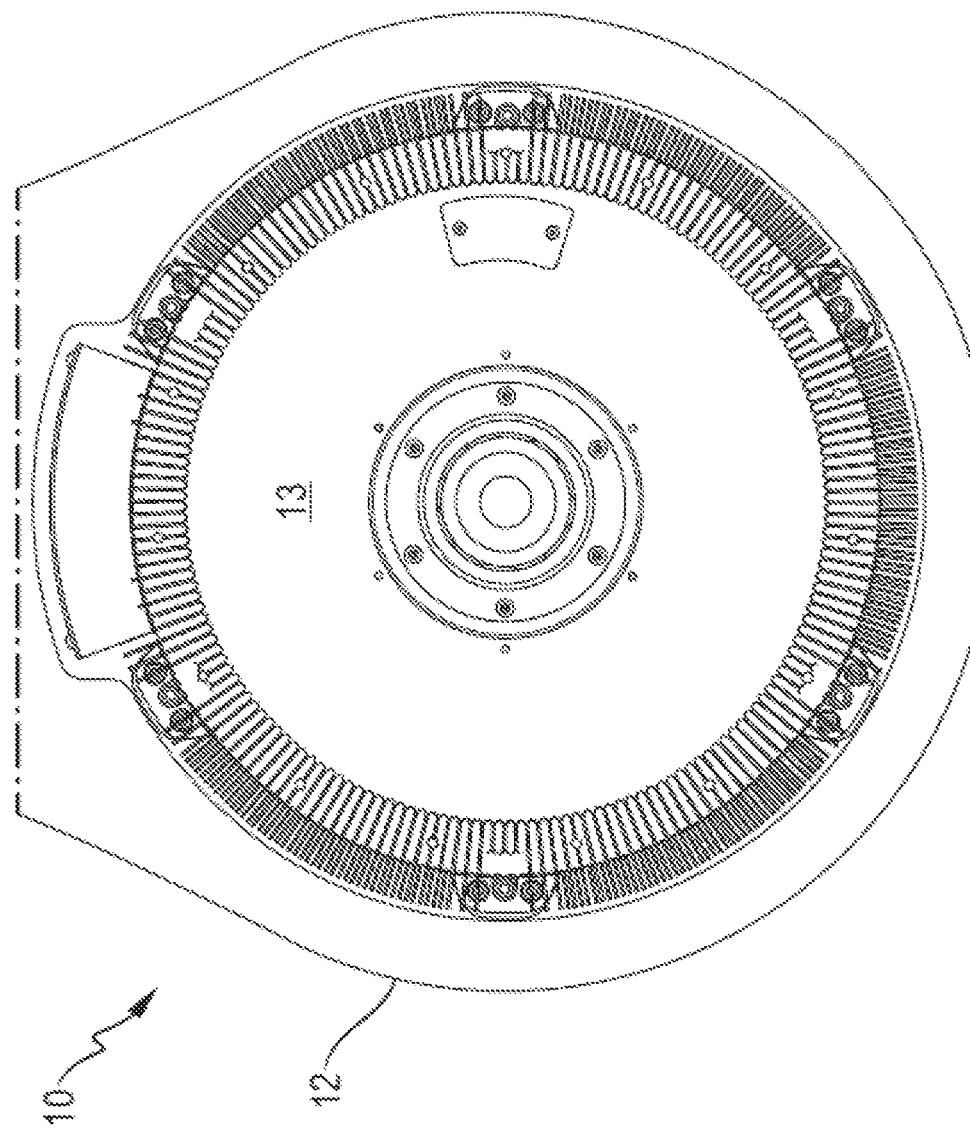
FIG. 7 shows the bottom view of a nose lift unit according to one embodiment.
Figure 8:
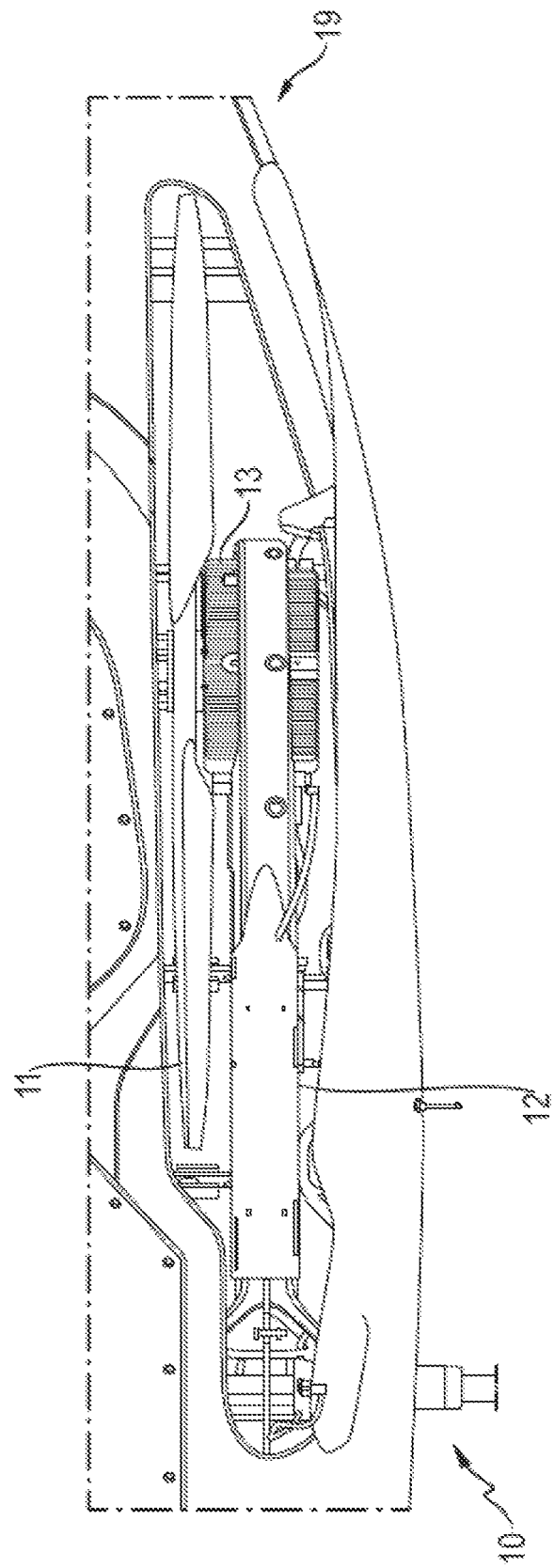
FIG. 8 shows a side view of the nose lift unit in a cavity of the aircraft.
Figure 9:
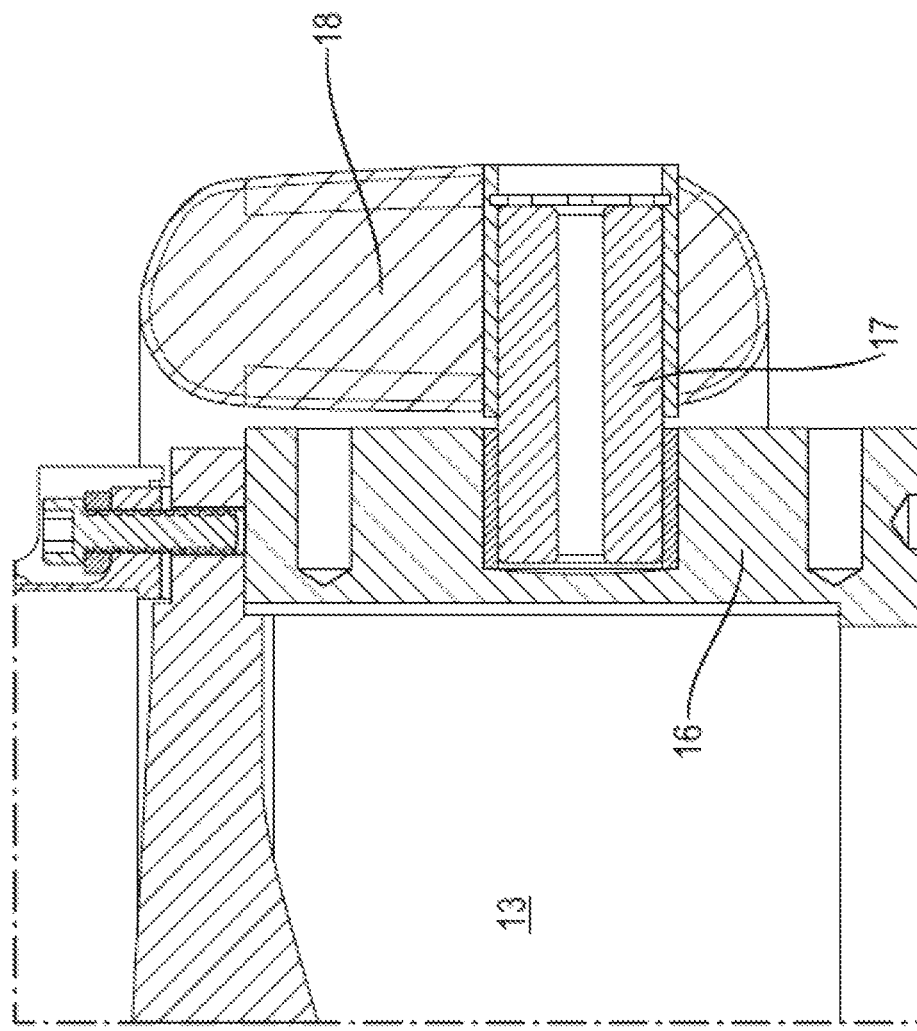
FIG. 9 shows a detail of the nose lift unit in a sectional view.

FIG. 7 illustrates the corresponding configuration of one of the nose lift units (10), whose engine bearing (12) is annularly formed. As can be seen in FIG. 8, the nose of the aircraft comprises a cavity (19), which receives the lift unit (10) but allows it to extend laterally as needed. Here, too, the engine bearings (12) and engine housing (16) are connected by a shear bolt (17) oriented radially to the electric engine (13).

In the present embodiment, the electric engine (13) is embodied as an air-cooled internal rotor with integrated control. It is understood that, in an alternative configuration, for example, an external runner or liquid cooling can be employed without departing from the scope of the invention. Further exemplary options are disclosed in, for example, DUFFY, Michael, et al. Propulsion scaling methods in the era of electric flight. In: 2018 *HIAA/IEEE Electric Aircraft Technologies Symposium* (*EATS*). IEEE, 2018. pg. 1-23. Each of these references is incorporated by reference herein.

What is claimed is:

1. An aircraft comprising:
    an aircraft vehicle structure including a grid of interconnected struts, wherein two struts of the interconnected struts run parallel to one another,
    engine bearings respectively defined on each of the two struts,
    an aircraft lift unit including a fan and a cylindrical electric engine having a sheath surface that is framed and supported by the engine bearings,
    wherein the two struts tangentially flank the electric engine,
    wherein each bearing is mounted to the sheath surface of the engine by a fastener,
    wherein the electric engine comprises a hollow cylindrical engine housing, and the sheath surface of the electric engine is defined by the engine housing, and
    wherein the fasteners comprise shear bolts oriented radially towards the electric engine, and the shear bolts connect the engine housing to the engine bearings in a torsionally rigid manner.

2. The aircraft according to claim 1, wherein the lift unit comprises a fan sheath and fin assemblies, and at least one of the fin assemblies is arranged on a face of the fan sheath.

3. The aircraft according to claim 1, wherein the lift unit comprises a spinner, and the fan carries the spinner on a side of the fan facing away from the electric engine.

4. The aircraft according to claim 1, wherein the lift unit is arranged on a nose of the aircraft.

5. The aircraft according to claim 4, wherein the nose comprises a cavity receiving the lift unit, and the lift unit is extendable out of the cavity.

6. The aircraft according to claim 1, wherein the lift unit is arranged in a wing of the aircraft.

7. The aircraft according to claim 1, wherein each engine bearing is integrated on a respective strut of the interconnected struts.

8. An aircraft comprising:
    an aircraft vehicle structure including a grid of interconnected struts, wherein two struts of the interconnected struts run parallel to one another,
    engine bearings respectively defined on each of the two struts,
    an aircraft lift unit including a fan and a cylindrical electric engine having a sheath surface that is framed and supported by the engine bearings,
    wherein the two struts tangentially flank the electric engine,
    wherein each bearing is mounted to the sheath surface of the engine by a fastener, and
    wherein the cylindrical electric engine has an engine housing that is connected to the engine bearings by radially-oriented shear bolts such that the electric engine is configured to detach from the engine bearings upon yielding of the shear bolts.

9. The aircraft according to claim 8, wherein each engine bearing includes a passageway for accommodating one of the shear bolts.

* * * * *